Dec. 2, 1969  A. P. WILKENS  3,481,482
PILFER-PROOF MERCHANDISING CARD HOLDER
Filed Aug. 11, 1967
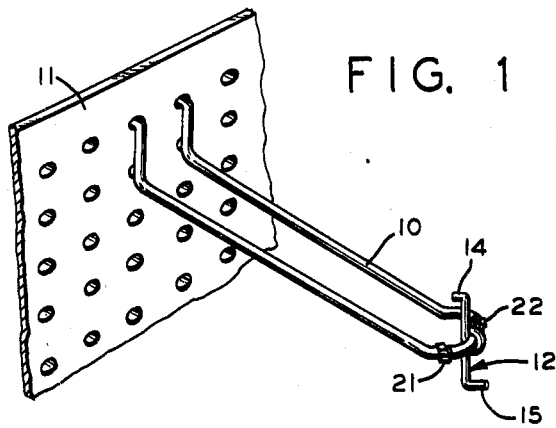
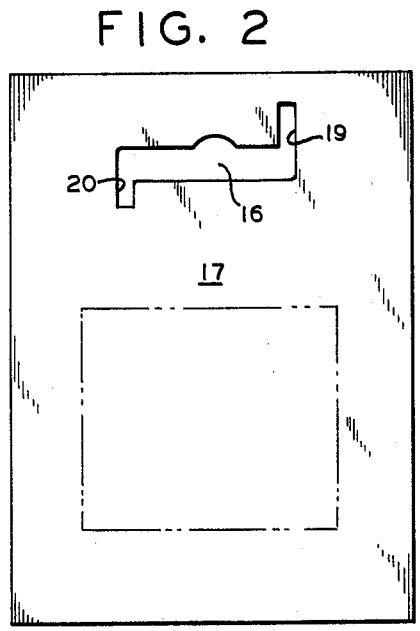
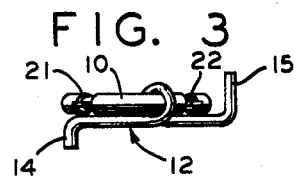
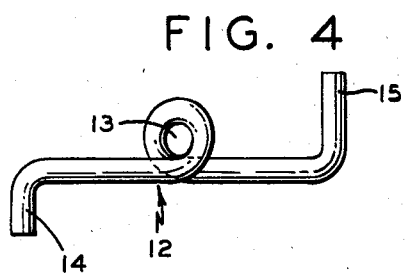
INVENTOR.
August P. Wilkens
BY
ATTORNEY.

United States Patent Office 3,481,482
Patented Dec. 2, 1969

3,481,482
PILFER-PROOF MERCHANDISING CARD HOLDER
August P. Wilkens, 309 Crescent Parkway, Sea Girt, N.J. 08750
Filed Aug. 11, 1967, Ser. No. 660,079
Int. Cl. A47f 7/00
U.S. Cl. 211—57      7 Claims

ABSTRACT OF THE DISCLOSURE

A pilfer resisting dog is mounted on a holder device, the dog being so mounted on the holder device that it may be manipulated into a particular position relatively to the holder device. The dog is so shaped that when manipulated into a correct position on the holder device, it, together with the holder device, will present a combined configuration to which may be matched an opening formed in a merchandise carrying card. If the opening of the card is correct, and if the dog is properly positioned, the card may be applied or removed from the holder device.

---

This invention relates to a pilfer-proof merchandise card and holder combination. Combinations of this class are utilized for displaying carded merchandise through the placing of the merchandise on cards that are hung from holder supports.

These supports generally take the place of a bracket presenting an extending portion over which the merchandise card may be moved through the forming of a hole in the card for the purpose. Pilfering of merchandise cards is quite common because these cards are generally placed in super markets, variety stores, and other types of self-service retail establishments. Therefore, there is a considerable demand for a pilfer-proof merchandise card and holder combination such as herein disclosed.

Some attempts have been made to develop pilfer-proof combinations and these have generally taken the form of a dog mounted on the end of a holder bracket and adapted to be moved so as to be aligned with the holder bracket so that both the dog and the holder bracket will readily permit the passage of a card having an opening accommodating the aligned dog and bracket.

Unfortunately, devices of the particular class are easily attacked, since it is possible to hold the dog with one finger while moving a card outwardly off the holder bracket and past the dog. In the combination I have conceived, the dog has a very peculiar shape, and is at no time adapted to be aligned with the holder bracket. Further, the dog hangs normally in a particular position to which it preferably moves under the influence of gravity. The card has a peculiarly shaped opening, and if by careful manipulation the dog is moved into predetermined relation to its holder, the peculiarly shaped opening of the card will pass over the holder and the dog.

By forming the dog in any particular predetermined manner, the opening in the card must be shaped to conform to the dog and a particular position relationship of the dog to the holder. This requires a very accurate and rather difficult movement of the dog on the holder by one hand to reach the position relationship required, while the merchandise card is simultaneously moved by the other hand into or out of support relation to the holder bracket. This means that two hands must be used to both move and hold the dog and card in required positions, and that some complex manipulation is required in order to remove a merchandise card, thereby making pilfering much more difficult than with devices of the prior art.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention.

Referring now to the drawings, FIGURE 1 is an isometric view of my invention, showing the pilfer resisting dog in its normal position to which it moves by gravity;

FIGURE 2 shows the merchandising card of my invention with a specially shaped opening;

FIGURE 3 shows how the dog is positioned manually on the holder device in order to permit alignment of the holder device and dog with the opening of the merchandising card; and FIGURE 4 is a plan view of the coiled pilfer resisting dog.

Referring now more particularly to the drawing, the holder device is in the form of a wire loop 10 of the type adapted to be assembled in a standard manner on a Peg Board 11. The holding dog, best shown in FIGURE 4, is designated generally by reference numeral 12 and is formed from a piece of wire so as to have a central opening 13 traversed by the wire of the holder 10 as clearly shown in FIGURES 1 and 3. The dog has a relatively short leg 14 and a relatively longer leg 15 arranged so that gravity will urge the dog to a vertical position on the holder 10. There is a further purpose for the longer leg 15. Thus, the dog must be aligned relatively to its holder device as shown in FIGURE 3, in order that the holder device and dog present the particular configuration shown in FIGURE 3 to the opening 16 of the merchandising card 17 shown in FIGURE 2.

In other words, in order to apply the merchandising card 17 to the holder device 10, it is necessary to place the dog 12 in its position of FIGURE 3 with the leg 15 pointing upwardly and the leg 14 pointing downwardly. Now, the opening 16 has its portion 19 corresponding to leg 15 aligned with the said leg while the portion 20 is in alignment with the relatively shorter leg 14 of the dog 12.

It will be appreciated that once the merchandising card 17 is applied to the holder device 10, it can only be removed if the dog 12 is once again carefully placed in the position of FIGURE 3 and there held by the fingers of one hand while the merchandising card is slipped over the dog and holder with the opening 16 aligned properly as has already been set forth.

In order to maintain the dog against movement away from its position of FIGURE 1, the holder device is preferably swaged at 21 and 22 presenting obstructions to the movement of the dog away from a central position as will be rather clear.

I do believe that the extreme simplicity of my invention and its extremely low cost, as well as its great effectiveness, will now be most clear to those skilled in the art.

What is claimed is:
1. A pilfer proof merchandise card and holder combination comprising a holder device having an extending portion for supporting a merchandising card, said card having a specially shaped opening having at least one dimension whereby it may be slipped over said extending portion and to hang therefrom thereafter or be freely removed therefrom, a pilfer resisting dog supported on said extending portion for compound motion in at least two planes relatively to said extending portion and normally positioned thereon and relatively to the specially shaped opening in said card whereby together with said extending portion defining a combined configuration which is substantially different and larger than said extending portion in all positions of said dog and forms an obstruction to the insertion of said card over said extending portion, and said dog and extending portion and said opening being so shaped and related that particular manipulation of said dog in at least two planes relatively to said extending portion and a card will so match said dog and extending portion and the opening of said card as to align the particularly shaped obstruction of said combined configuration to the opening in the card to permit the insertion or removal of said card from said extending portion through passage of both said dog and extending portion through the specially shaped opening of the card.

2. In the combination of claim 1, the feature that said dog is mounted on said extending portion for substantial manipulation into angular positions relatively to said extending portion to present a particular configuration which will move through said opening.

3. In the combination of claim 1, the feature that said extending portion comprises a wire loop with said dog mounted at the apex of the loop for rotation and angular positioning.

4. In the combination of claim 2, the feature that said extending portion comprises a wire loop with said dog mounted at the apex of the loop for rotation and angular positioning.

5. In the combination of claim 1, the feature that said extending portion comprises a wire shaped as a loop with parallel legs connected by a curved end over which the cards are slipped, said dog being freely mounted on said curved end for free angular positioning.

6. In the combination of claim 2, the feature that said extending portion comprises a wire shaped as a loop with parallel legs connected by a curved end over which the cards are slipped, said dog being freely mounted on said curved end for free angular positioning.

7. In the combination of claim 2, the feature that said extending portion comprises a wire loop, said dog being formed as a wire coil wrapped loosely about the wire of said loop with opposed extending ends and adapted for free angular positioning on said loop.

References Cited

UNITED STATES PATENTS

| | | | |
|---|---|---|---|
| 983,007 | 1/1911 | Thompson | 129—23 |
| 1,268,246 | 6/1918 | Hubinger | 211—6 |
| 2,519,612 | 8/1950 | Tuttle | 211—60 X |
| 3,245,547 | 4/1966 | Felkay | 211—59 |

CHANCELLOR E. HARRIS, Primary Examiner

U.S. Cl. X.R.

129—23